(12) United States Patent
Sun et al.

(10) Patent No.: US 10,815,324 B2
(45) Date of Patent: *Oct. 27, 2020

(54) ETHYLENE/ALPHA-OLEFIN COPOLYMER HAVING EXCELLENT ENVIRONMENTAL STRESS CRACK RESISTANCE

(71) Applicant: LG Chem, Ltd., Seoul (KR)

(72) Inventors: Soon Ho Sun, Daejeon (KR); Yo Han Bae, Daejeon (KR); Hyeong Il Lee, Daejeon (KR); Yi Young Choi, Daejeon (KR); Bog Ki Hong, Daejeon (KR); Sung Min Lee, Daejeon (KR); Sun Mi Kim, Daejeon (KR); Jin Young Park, Daejeon (KR)

(73) Assignee: LG Chem, Ltd. (KR)

( * ) Notice: Subject to any disclaimer, the term of this patent is extended or adjusted under 35 U.S.C. 154(b) by 42 days.

This patent is subject to a terminal disclaimer.

(21) Appl. No.: 16/088,661

(22) PCT Filed: Nov. 2, 2017

(86) PCT No.: PCT/KR2017/012341
§ 371 (c)(1),
(2) Date: Sep. 26, 2018

(87) PCT Pub. No.: WO2018/093078
PCT Pub. Date: May 24, 2018

(65) Prior Publication Data
US 2020/0048381 A1    Feb. 13, 2020

(30) Foreign Application Priority Data

Nov. 15, 2016 (KR) .................. 10-2016-0152221

(51) Int. Cl.
*C08F 210/16* (2006.01)
*C08F 4/64* (2006.01)
*C08F 4/659* (2006.01)
*C08F 4/642* (2006.01)

(52) U.S. Cl.
CPC .......... *C08F 210/16* (2013.01); *C08F 4/6428* (2013.01); *C08F 4/65916* (2013.01); *C08F 2500/04* (2013.01); *C08F 2500/12* (2013.01); *C08F 2500/13* (2013.01)

(58) Field of Classification Search
None
See application file for complete search history.

(56) References Cited

U.S. PATENT DOCUMENTS

| | | | |
|---|---|---|---|
| 4,935,474 A | 6/1990 | Ewen et al. | |
| 6,180,736 B1 | 1/2001 | Muhle et al. | |
| 6,841,631 B2 | 1/2005 | Loveday et al. | |
| 6,894,128 B2 | 5/2005 | Loveday et al. | |
| 6,911,508 B2 | 6/2005 | McCullough | |
| 9,493,589 B1 | 11/2016 | Greco et al. | |
| 2004/0048993 A1 | 3/2004 | Ishihama et al. | |
| 2008/0045679 A1 | 2/2008 | Davey et al. | |
| 2008/0257854 A1 | 10/2008 | Stephenne et al. | |
| 2010/0084363 A1* | 4/2010 | Michie, Jr. ............. | B65D 41/24 215/200 |
| 2011/0034635 A1 | 2/2011 | Kapur et al. | |
| 2015/0141579 A1 | 5/2015 | Bellehumeur et al. | |
| 2016/0083488 A1* | 3/2016 | Buryak ................. | C08F 210/02 526/348.4 |
| 2016/0280822 A1 | 9/2016 | Kim et al. | |
| 2016/0333172 A1 | 11/2016 | Koch et al. | |
| 2017/0044278 A1 | 2/2017 | Lee et al. | |
| 2018/0016370 A1 | 1/2018 | You et al. | |
| 2018/0030180 A1 | 2/2018 | Sung et al. | |

FOREIGN PATENT DOCUMENTS

| | | |
|---|---|---|
| CN | 101490163 A | 7/2009 |
| CN | 104870550 A | 8/2015 |
| EP | 2017302 A1 | 1/2009 |
| JP | 2001064331 A | 3/2001 |
| JP | 2005281543 A | 10/2005 |
| JP | 4439188 B2 | 3/2010 |
| JP | 5763964 B2 | 8/2015 |
| JP | 2016141747 A | 8/2016 |
| KR | 100507458 B1 | 8/2005 |
| KR | 100848525 B1 | 7/2008 |
| KR | 20100111708 A | 10/2010 |
| KR | 101174620 B1 | 8/2012 |
| KR | 20130033362 A | 4/2013 |
| KR | 101275543 B1 | 6/2013 |
| KR | 101357895 B1 | 2/2014 |
| KR | 101592436 B1 | 2/2016 |
| KR | 20160043516 A | 4/2016 |
| KR | 20160088876 A | 7/2016 |
| KR | 20160106660 A | 9/2016 |
| KR | 20160121940 A | 10/2016 |
| KR | 20160122065 A | 10/2016 |

(Continued)

OTHER PUBLICATIONS

International Search Report for PCT/KR2017/012341 dated Feb. 6, 2018.
Extended European Search Report including the Written Opinion for Application No. EP 17872379.7 dated Apr. 18, 2019.
Chinese Search Report for Application No. 201780021146.6 dated May 25, 2020, 1 page.

* cited by examiner

*Primary Examiner* — Richard A Huhn
(74) *Attorney, Agent, or Firm* — Lerner, David, Littenberg, Krumholz & Mentlik, LLP

(57) ABSTRACT

Provided is an ethylene/alpha-olefin copolymer having excellent environmental stress crack resistance.

7 Claims, No Drawings

(56) References Cited

FOREIGN PATENT DOCUMENTS

| KR | 20160123172 A | 10/2016 | |
|----|---------------|---------|---|
| KR | 20160147638 A | 12/2016 | |
| KR | 20180040998 A | 4/2018 | |
| WO | 2008136849 A1 | 11/2008 | |
| WO | 2014096104 A1 | 6/2014 | |
| WO | WO-2016167568 A1 * | 10/2016 | ............ C08F 210/16 |

ETHYLENE/ALPHA-OLEFIN COPOLYMER HAVING EXCELLENT ENVIRONMENTAL STRESS CRACK RESISTANCE

CROSS-REFERENCE TO RELATED APPLICATIONS

This application is a national phase entry under 35 U.S.C. § 371 of International Application No. PCT/KR2017/012341, filed Nov. 2, 2017, which claims priority to Korean Patent Application No. 10-2016-0152221, filed Nov. 15, 2016, the disclosures of which are hereby incorporated by reference.

TECHNICAL FIELD

The present invention relates to an ethylene/alpha-olefin copolymer having excellent crack resistance.

BACKGROUND OF ART

For a resin used as a food container, etc., excellent processability, mechanical properties, and environmental stress crack resistance are required. Thus, there has been a continuous demand for a technology of preparing a polyolefin that satisfies a high molecular weight, a wider molecular weight distribution, and a preferred comonomer distribution, etc., thereby being preferably applied to a container, a bottle cap, etc.

Meanwhile, a metallocene catalyst using Group 4 transition metal may easily control a molecular weight and a molecular weight distribution of a polyolefin, as compared with the existing Ziegler-Natta catalyst, and may control a comonomer distribution of a polymer, and thus, it has been used for preparing a polyolefin having improved mechanical properties and processability at the same time. However, the polyolefin prepared using the metallocene catalyst has a problem in terms of lowered processability due to a narrow molecular weight distribution.

In general, as a molecular weight distribution is wider, a decrease of viscosity according to a shear rate becomes large, thus exhibiting excellent processability in a processing area. However, a polyolefin prepared using the metallocene catalyst, due to a relatively narrow molecular weight distribution, has high viscosity at a high shear rate, and therefore, a high load or pressure is applied thereto at the time of extrusion. As a result, there are disadvantages that extrusion productivity is lowered, bubble stability is significantly lowered at the time of a blow molding process, and a prepared molded article has a non-uniform surface, thereby causing a decrease in transparency, etc.

Accordingly, multi-stage reactors including a plurality of reactors have been used to obtain a polyolefin having a wide molecular weight distribution using the metallocene catalyst, and there has been an attempt to obtain a polyolefin that satisfies a wider multimodal molecular weight distribution and a high molecular weight at the same time through each polymerization step in the plural reactors.

However, due to high reactivity of the metallocene catalyst, it was difficult to properly polymerize a polyolefin in a reactor of a latter stage due to a polymerization duration time in a reactor of a former stage, and as the result, there was a limit in the preparation of a polyolefin that satisfies a sufficiently high molecular weight and a wider multimodal molecular weight distribution at the same time. Therefore, these is a continuous demand for the development of a technology capable of more effectively preparing a polyolefin that may have a high molecular weight and a wider multimodal molecular weight distribution to satisfy mechanical properties and processability at the same time, and may be preferably used for products.

U.S. Pat. No. 6,180,736 describes a method of preparing a polyethylene in a single gas-phase reactor or a continuous slurry reactor using one kind of a metallocene catalyst. Upon using this method, there are advantages that polyethylene production cost is low, fouling hardly occurs, and polymerization activity is stable. In addition, U.S. Pat. No. 6,911,508 describes preparation of polyethylene with improved rheological properties by using a novel metallocene catalyst compound, with 1-hexene as comonomers, in a single gas-phase reactor. However, the polyethylenes described in these patents also have a narrow molecular weight distribution, and thus it is difficult to achieve sufficient impact strength and processability.

U.S. Pat. No. 4,935,474 describes a method of preparing a polyethylene having a wide molecular weight distribution using two or more kinds of metallocene compounds. In addition, U.S. Pat. Nos. 6,841,631, and 6,894,128 describe that a polyethylene having a bimodal or multimodal molecular weight distribution is prepared using a metallocene-based catalyst having at least two kinds of metal compounds, and this polyethylene may be applied for the preparation of a film, a pipe, a hollow molded article, etc. However, although the prepared polyethylene has improved processability, there are still problems that a dispersed state per molecular weight within unit particles is not uniform, and therefore, appearance is rough and physical properties are not stable even under relatively favorable processing conditions.

Under this background, there is a continuous demand for the preparation of a superior resin having a balance between physical properties or a balance between physical properties and processability, and studies thereon are further required.

DETAILED DESCRIPTION OF THE INVENTION

Technical Problem

In order to solve the problems of the prior art, the present invention provides an ethylene/alpha-olefin copolymer having excellent environmental stress crack resistance.

Technical Solution

In order to achieve the above object, the present invention provides an ethylene/alpha-olefin copolymer which satisfies the following conditions:

a weight average molecular weight of 50,000 g/mol to 250,000 g/mol, a molecular weight distribution (Mw/Mn) of 4 to 20, a density of 0.950 $g/cm^3$ to 0.965 $g/cm^3$, a melt flow rate ratio ($MFR_5/MFR_{2.16}$, as measured at 190° C. according to ASTM 1238) of 3 to 10, and environmental stress crack resistance (as measured according to ASTM D1693-B) of 150 hrs or more.

Environmental stress crack resistance (ESCR) is known as one of very important properties of a resin used in a food container, a bottle cap, etc. ESCR is an indicator that determines stability and resistance of a resin to oil and fat contained in foods, etc., and is important in assuring continuous performances of the resin.

A high-molecular weight polymer is generally known to have improved mechanical properties, as compared with a low-molecular weight polymer, and thus environmental stress crack resistance may be improved, as a molecular weight of a polymer increases. However, as the molecular weight increases, there is a problem that processibility and flowability decrease.

However, the ethylene/alpha-olefin copolymer according to the present invention may have a high molecular weight distribution and a high melt flow rate ratio while having improved environmental stress crack resistance, and therefore, the ethylene/alpha-olefin copolymer has excellent processibility, which is advantageous when it is molded. Accordingly, it may be applied to various fields.

A weight average molecular weight of the ethylene/alpha-olefin copolymer according to the present invention is 50,000 g/mol to 250,000 g/mol. The weight average molecular weight is preferably 100,000 or more, 110,000 or more, 120,000 or more, 130,000 or more, 140,000 or more, 150,000 or more, 160,000 or more, 170,000 or more, or 180,000 or more. Further, the weight average molecular weight is preferably 240,000 or less, 230,000 or less, or 220,000 or less.

A molecular weight distribution (Mw/Mn) of the ethylene/alpha-olefin copolymer according to the present invention is 4 to 20. The molecular weight distribution is preferably 5 or more, 6 or more, 7 or more, 8 or more, 9 or more, or 10 or more. Further, the molecular weight distribution is preferably 19 or less, 18 or less, 17 or less, 16 or less, or 15 or less.

A melt flow rate ratio ($MFR_5/MFR_{2.16}$, as measured at 190° C. according to ASTM 1238) of the ethylene/alpha-olefin copolymer according to the present invention is 3 to 10. The melt flow rate ratio is preferably 4 or more, or 5 or more. Further, the melt flow rate ratio is preferably 9 or less, or 8 or less.

Further, environmental stress crack resistance (ESCR) of the ethylene/alpha-olefin copolymer according to the present invention, as measured according to ASTM D1693-B, is 150 hrs or more, and more preferably 200 hrs or more. If the environmental stress crack resistance (ESCR) is 150 hrs or more, the copolymer may stably maintain performances when used as a food container, etc. Thus, the upper limit is substantially of no significance. However, for example, the upper limit may be about 1,000 hrs or less, 900 hrs or less, 800 hrs or less, 700 hrs or less, 500 hrs or less, or 400 hrs or less. As such, since the ethylene/alpha-olefin copolymer exhibits environmental stress crack resistance of high performance, it has high stability when being molded into a product, and may maintain continuous performance.

Further, crack resistance of the ethylene/alpha-olefin copolymer according to the present invention, as measured according to the following method, is 100 hrs or more.

while a cap (28 mm cap according to PET standard PCO 1881) obtained by injection-molding of the ethylene/alpha-olefin copolymer is immersed in a bath containing a 5% igepal solution, a water pressure of 5 bar is applied to the inside of the cap, and the time at which the water pressure begins to decrease was measured.

Further, the ethylene/alpha-olefin copolymer may include an ethylene homopolymer or may include other comonomers in addition to ethylene. A content of the comonomer is preferably 0.5% by weight to 5% by weight with respect to metallocene polypropylene. The comonomer may be alpha-olefin having 3 to 10 carbon atoms, except for ethylene, and for example, the comonomer may include one or more selected from the group consisting of 1-propylene, 1-butene, 1-pentene, 1-hexene, 4-methyl-1-pentene, 1-octene, 1-decene, 1-docene, 1-tetradecene, 1-hexadecene, 1-octadecene, 1-eicosens, and mixtures thereof. Preferably, the comonomer may be 1-butene.

The ethylene/alpha-olefin copolymer may be prepared by polymerizing ethylene and the comonomer in the presence of a single metallocene compound-supported catalyst including a metallocene compound of the following Chemical Formula 1; a first cocatalyst compound; a borate-based second cocatalyst; and a carrier:

$$(Cp^1R^1)_n(Cp^2R^2)MX_{3-n} \quad \text{[Chemical Formula 1]}$$

in Chemical Formula 1,

M is Group 4 transition metal;

$Cp^1$ and $Cp^2$ are the same as or different from each other, and each independently, any one selected form the group consisting of cyclopentadienyl, indenyl, 4,5,6,7-tetrahydro-1-indenyl, and fluorenyl radical, which may be substituted with hydrocarbon having 1 to 20 carbon atoms, provided that all $Cp^1$ and $Cp^2$ are not cyclopentadienyl;

$R^1$ and $R^2$ are the same as or different from each other, and each independently, hydrogen, C1 to C20 alkyl, C1 to C10 alkoxy, C2 to C20 alkoxyalkyl, C6 to C20 aryl, C6 to C10 aryloxy, C2 to C20 alkenyl, C7 to C40 alkylaryl, C7 to C40 arylalkyl, C8 to C40 arylalkenyl, or C2 to C10 alkynyl;

X is a halogen atom, C1 to C20 alkyl, C2 to C10 alkenyl, C7 to C40 alkylaryl, C7 to C40 arylalkyl, C6 to C20 aryl, substituted or unsubstituted C1 to C20 alkylidene, substituted or unsubstituted amino group, C2 to C20 alkylalkoxy, or C7 to C40 arylalkoxy; and n is 1 or 0.

A method of preparing the single metallocene compound-supported catalyst includes supporting the metallocene compound of Chemical Formula 1 on a carrier, before or after supporting the first cocatalyst (for example, an organometallic compound including aluminum) on the carrier.

In the single metallocene-supported catalyst, a mole ratio of metal included in the metallocene compound:boron included in the borate-based second cocatalyst may be about 1:0.5 to about 1:3, or about 1:0.8 to about 1:2, or about 1:0.9 to about 1:1.5. If the mole ratio is less than 1:0.5, there is a problem that catalytic activity may be lowered, and if it is greater than 1:3, although the activity is excellent, there is a disadvantage that polymerization reactivity is not uniform and thus process operation is not easy.

Further, in the single metallocene-supported catalyst, examples of specific substituents of Formula 1 are as follows.

The C1 to C20 alkyl group may include a linear or branched alkyl group, and specifically, a methyl group, an ethyl group, a propyl group, an isopropyl group, an n-butyl group, a tert-butyl group, a pentyl group, a hexyl group, a heptyl group, an octyl group, etc.

The C2 to C20 alkenyl group may include a linear or branched alkenyl group, and specifically, an allyl group, an ethenyl group, a propenyl group, a butenyl group, a pentenyl group, etc.

The C6 to C20 aryl group may include a monocyclic or polycyclic aryl group, and specifically, a phenyl group, a biphenyl group, a naphthyl group, a phenanthrenyl group, a fluorenyl group, etc.

The C1 to C10 alkoxy group may include a methoxy group, an ethoxy group, a phenyloxy group, a hexyloxy group, etc.

The C2 to C20 alkoxyalkyl group may include a methoxymethyl group, a tert-butoxymethyl group, a tert-butoxyhexyl group, a 1-ethoxyethyl group, a 1-methyl-1-methoxyethyl group, etc.

The Group 4 transition metal may include titanium, zirconium, hafnium, etc.
The metallocene compound represented by Formula 1 may be, for example, a compound represented by any one of the following Structural Formulae, but is not limited thereto:
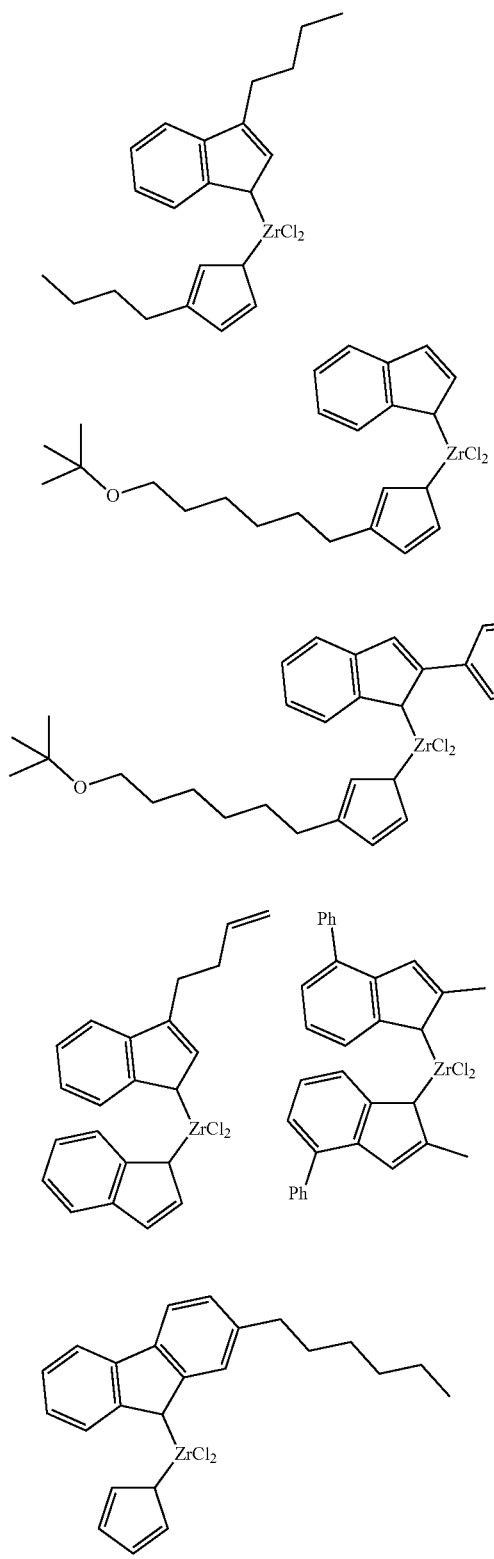
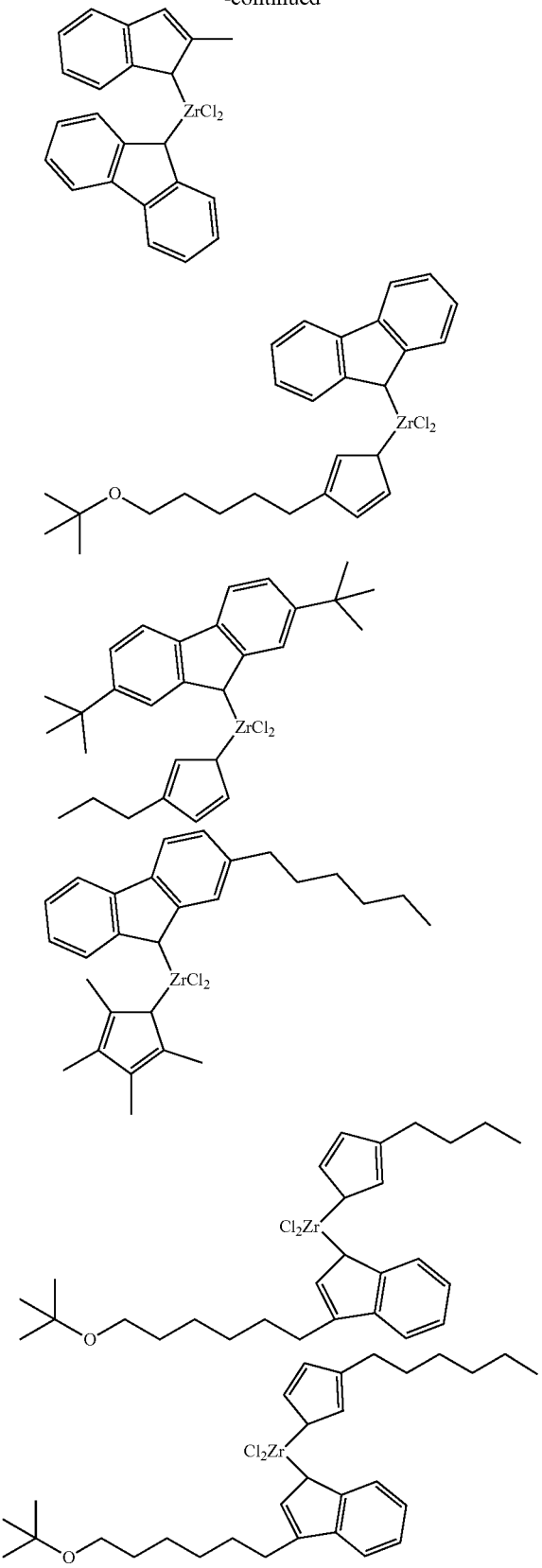
In the single metallocene compound-supported catalyst, the carrier for supporting the metallocene compound may include a hydroxyl group on the surface thereof. That is, as the amount of the hydroxyl groups (—OH) on the surface of the carrier is smaller, it is better, but it is practically difficult to remove all the hydroxyl groups. Thus, the amount of the hydroxyl groups may be controlled by the preparation method and conditions of the carrier or drying conditions (temperature, time, drying method, etc.), etc. For example, it is preferable that the amount of the hydroxyl groups on the surface of the carrier is 0.1 mmol/g to 10 mmol/g, more preferably 0.5 mmol/g to 1 mmol/g. If the amount of the hydroxyl groups is less than 0.1 mmol/g, the sites for reaction with a cocatalyst may decrease, and if it is greater than 10 mmol/g, there is a possibility that the hydroxyl groups may be attributed to moisture other than the hydroxyl groups existing on the surface of the carrier, which is not preferable.

In this regard, in order to reduce side reactions due to the few hydroxyl groups remaining after drying, a carrier in which the hydroxyl groups are chemically removed while conserving highly reactive siloxane groups involved in the supporting, may be used.

In this case, it is preferable that the carrier has both highly reactive hydroxyl groups and siloxane groups on the surface thereof. Examples of the carrier may include high-temperature dried silica, silica-alumina, or silica-magnesia, etc., which may commonly contain oxide, carbonate, sulfate, or nitrate components such as $Na_2O$, $K_2CO_3$, $BaSO_4$, or $Mg(NO_3)_2$, etc.

It is preferable that the carrier is sufficiently dried before the first and second cocatalysts are supported. In this regard, a drying temperature of the carrier is preferably 200° C. to 800° C., more preferably 300° C. to 600° C., and most preferably 400° C. to 600° C. If the drying temperature of the carrier is lower than 200° C., moisture on the surface may react with the cocatalysts due to too much moisture, and if the drying temperature is higher than 800° C., pores on the surface of the carrier may combine to reduce the surface area, and a lot of hydroxyl groups on the surface may disappear and only siloxane groups may remain, thereby decreasing the reaction sites with the cocatalyst, which is not preferable.

Meanwhile, the single metallocene compound catalyst may include a first cocatalyst and a second cocatalyst so as to make active catalyst species. By using the two kinds of cocatalyst, catalytic activity may be improved, and particularly, by using the second cocatalyst, the molecular weight distribution of polyolefin may be controlled.

The first cocatalyst may be any cocatalyst, as long as it is used upon polymerizing olefins in the presence of a common metallocene catalyst. By the first cocatalyst, a bond between the hydroxyl groups and Group 13 transition metal in the carrier is generated. Further, the first cocatalyst may contribute to securing of the unique properties of the single metallocene supported catalyst of the present invention, because the first cocatalyst exists on only the surface of the carrier to avoid fouling in which polymer particles are coagulated to the wall surface of the reactor or coagulated with each other.

In the single metallocene compound-supported catalyst, the first cocatalyst may be one or more kinds selected from compounds represented by the following Chemical Formulae 2 and 3:

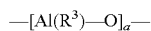  [Chemical Formula 2]

  [Formula 3]

in Chemical Formulae 2 and 3, $R^3$ may be the same as or different from each other, and each independently, halogen, or C1-C20 hydrocarbyl substituted or unsubstituted with halogen, and a is an integer of 2 or more, $R^4$ may be the same as or different from each other, and each independently, halogen; C1-C20 hydrocarbon, or C1-C20 hydrocarbon substituted with halogen, and D is aluminum or boron.

Examples of the compounds represented by Chemical Formula 2 may include methylaluminoxane, ethylaluminoxane, isobutylaluminoxane, butylaluminoxane, etc., and a more preferred compound is methylaluminoxane.

Examples of the compound represented by Chemical Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tollylaluminum, dimethylaluminum methoxide, dimethylaluminum ethoxide, trimethylboron, triethylboron, triisobutylboron, tripropylboron, tributylboron, etc., and a more preferred compound may be selected from trimethylaluminum, triethylaluminum, and triisobutylaluminum.

Meanwhile, the borate-based second cocatalyst included in the single metallocene compound catalyst, characterized in the present invention, may be a borate-based compound represented by the following Chemical Formula 4 or 5:

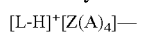  [Chemical Formula 4]

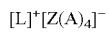  [Chemical Formula 5]

in Chemical Formulae 4 and 5,

L is each independently a neutral or cationic Lewis acid, H is each independently a hydrogen atom, Z is each independently boron, and A is each independently halogen of hydrogen valence of 1 or more, a C1-C20 hydrocaryl group, an alkoxy group, a phenoxy group, a C6-C20 aryl or alkyl group substituted with nitrogen, phosphorus, sulfur, or oxygen atom.

It may be preferable that the borate-based second cocatalyst includes trityltetrakis(pentafluorophenyl)borate, N,N-dimethylaniliniumtetrakis(pentafluorophenyl)borate, trimethylammoniumtetrakis(pentafluorophenyl)borate, triethylammoniumtetrakis(pentafluorophenyl)borate, or tripropylammoniumtetrakis(pentafluorophenyl)borate. The cocatalyst of the present invention is used for the preparation of polyolefin suitable for fiber preparation, thereby exhibiting specificity for the use and preparation method.

Meanwhile, when the single metallocene compound catalyst is prepared, the sequence of supporting of each component preferably includes the steps of supporting the metallocene compound of Chemical Formula 1, before or after supporting the first cocatalyst on a carrier, as described above; and supporting the borate-based second cocatalyst on the carrier.

Further, the supporting conditions are not particularly limited, and the supporting may be conducted within a range well known to those skilled in the art. For example, the supporting may be performed by appropriately using high temperature supporting and low temperature supporting, and specifically, supporting of the first cocatalyst and the second cocatalyst may be performed at a temperature of about 25° C. to about 100° C. In this regard, the supporting time of the first cocatalyst and the supporting time of the second cocatalyst may be appropriately controlled according to the amount of the cocatalyst to be supported. Further, the temperature at which the metallocene compound is reacted with the carrier may be about −30° C. to about 150° C., preferably room temperature to about 100° C., and more preferably about 30° C. to about 80° C. The supported catalyst that has been reacted may be used as it is after removing reaction solvents by filtration or vacuum distillation, and if necessary, it may be used after being soxhlet-filtered with aromatic hydrocarbon such as toluene.

Further, during the polymerization, the metallocene supported catalyst may be introduced after being diluted in the form of slurry with a C5-C12 aliphatic hydrocarbon solvent such as isobutene, pentane, hexane, heptane, nonane, decane, and isomers thereof; an aromatic hydrocarbon solvent such as toluene and benzene; a hydrocarbon solvent substituted with a chlorine atom such as dichloromethane and chlorobenzene, etc. It is preferable that the solvent is treated with a small amount of aluminum to remove a small amount of water, air, etc. which acts as catalyst poison, before use.

The polymerization may be conducted by a standard method while continuously supplying olefin monomers at a predetermined ratio, using a reactor selected from the group consisting of a continuous slurry polymerization reactor, a loop slurry reactor, a gas phase reactor, and a solution reactor alone, or using two or more of the same or different reactors.

During the polymerization, a polymerization temperature is preferably about 25° C. to about 500° C., more preferably about 25° C. to about 200° C., and much more preferably about 50° C. to about 150° C. Further, a polymerization pressure is preferably about 1 Kgf/cm$^2$ to about 100 Kgf/cm$^2$, more preferably about 1 Kgf/cm$^2$ to about 70 Kgf/cm$^2$, and most preferably about 5 Kgf/cm$^2$ to about 50 Kgf/cm$^2$.

Advantageous Effects

As described above, the ethylene/alpha-olefin copolymer according to the present invention is characterized by having excellent environmental stress crack resistance.

DETAILED DESCRIPTION OF THE EMBODIMENTS

Hereinafter, preferred examples will be provided for better understanding of the present invention. However, the following examples are provided only for understanding the present invention more easily, but the content of the present invention is not limited thereby.

Preparation Example

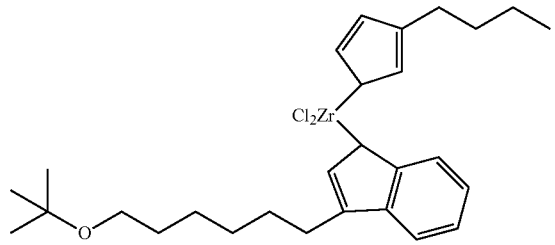

Into a well-dried 250 mL Schlenk flask, 11.6 mL (100 mmol) of indene was introduced and diluted in 80 mL of THF, followed by stirring. 48 mL of a 2.5M nBuLi hexane solution was slowly added thereto, and 3 hours later, 18.3 g (95 mmol) of 6-chloro hexyl tert-butyl ether was added and reacted for about 12 hours. It was observed that the reaction mixture turned into a light pink suspension as the reaction progressed. After the reaction was completed, 100 mL of water was added to the mixture, followed by extraction with 100 mL of ether three times or more. The collected organic layer was dried over MgSO$_4$, followed by solvent removal by vacuum filtration and additional vacuum distillation at 100° C., 20 mmHg, thereby obtaining a pure tether-indene ligand with a yield of 90%.

$^1$H NMR (500 MHz, CDCl$_3$): 1.22 (9H, s), 1.62 (2H, m), 1.77 (2H, m), 2.58 (2H, m), 3.36 (2H, s), 3.42 (2H, m), 6.28 (1H, s), 7.19 (1H, m), 7.24 (1H, m), 7.40 (1H, m), 7.48 (1H, m)

10 mmol of the obtained ligand was dissolved in 45 mL of ether, and then, 5 mL (1.25 equivalents) of a nBuLi hexane solution was added thereto. 6 hours later, 20 g (0.95 equivalents) of an nBuCpZrCl$_3$ toluene solution (0.273 g/mmol) was slowly added thereto at −78° C., and the temperature was raised, and then the solution was additionally stirred for a day. The reaction mixture was passed through a filter to obtain a filtrate, which was concentrated, extracted with 100 mL of hexane, and concentrated again to obtain the title compound with a yield of 90% or more.

$^1$H NMR (500 MHz, CDCl$_3$): 0.93 (3H, t), 1.15 (9H, s), 1.24~1.55 (10H, m), 1.58~1.64 (2H, m), 3.34 (2H, m), 5.77 (0.5H, s), 5.82 (1H, m), 6.02 (0.5H, s), 6.40 (1H, s), 6.62 (1H, s), 7.26 (2H, m), 7.42 (2H, m)

Example 1

Step 1) Preparation of Supported Catalyst

Into a glass reactor, 49.7 mL of a 10 wt % methylaluminoxane (MAO)/toluene solution was introduced, 9.1 g of silica (product name: Grace 952, particle size: 30 μm, surface area: 300 m$^2$/g, pore volume: 1.6 mL/g, pore diameter: 20 nm) was introduced at 40° C., and then the solution was stirred at 200 rpm for 16 hours while raising the temperature of the reactor to 60° C. Thereafter, the temperature was lowered again to 40° C., 441 mg of the metallocene compound of Preparation Example was dissolved in toluene in a solution state and introduced, followed by stirring for 2 hours. Next, 730 mg of N,N-dimethylaniliniumtetrakis(pentafluorophenyl)borate was dissolved in 20 mL of toluene and introduced in a solution state, followed by stirring at 40° C. for 2 hours. After the reaction was completed, stirring was stopped, a toluene layer was separated and removed, and then remaining toluene was removed under reduced pressure at 40° C., thereby preparing a single metallocene supported catalyst.

Step 2) Preparation of Ethylene/1-Butene Copolymer

Polymerization was performed using the supported catalyst prepared above and a hexane slurry stirred tank process. Polymerization conditions included 10 kg/hr of ethylene, a pressure of 7 kg/cm$^2$, a temperature of 82° C., 3 g/hr of hydrogen, and 7 cc/min of 1-butene.

Example 2

An ethylene/1-butene copolymer was prepared in the same manner as in Example 1, except that a polymerization condition of 3.5 g/hr of hydrogen was used in step 2 of Example 1.

Example 3

An ethylene/1-butene copolymer was prepared in the same manner as in Example 1, except that a polymerization condition of 3.6 g/hr of hydrogen was used in step 2 of Example 1.

Example 4

An ethylene/1-butene copolymer was prepared in the same manner as in Example 1, except that a polymerization condition of 3.7 g/hr of hydrogen was used in step 2 of Example 1.

Example 5

An ethylene/1-butene copolymer was prepared in the same manner as in Example 1, except that a polymerization condition of 3.3 g/hr of hydrogen was used in step 2 of Example 1.

Comparative Examples 1 to 4

The following compounds were used as Comparative Examples.

Comparative Example 1: CAP602 (INEOS)
Comparative Example 2: CAP508 (INEOS)
Comparative Example 3: Lutene® H ME1000 (LG Chem)
Comparative Example 4: Lumicene® M5220 (Total)

Experimental Example

Physical properties of the copolymers of Examples and Comparative Examples were evaluated by the following methods.

1) Density: ASTM D1505.
2) Melt Index (MFR, 5 kg/2.16 kg): measurement temperature of 190° C., ASTM 1238.
3) MFRR($MFR_5/MFR_{2.16}$): a ratio obtained by dividing $MFR_5$ melt index (MI, 5 kg of load) by $MFR_{2.16}$ (MI, 2.16 kg of load).
4) Mn, Mw, and MWD: samples were pretreated by dissolving in 1,2,4-trichlorobenzene containing 0.0125% BHT using PL-SP260 at 160° C., 10 hours, and a number average molecular weight and a weight average molecular weight thereof were measured at a measurement temperature of 160° C. using PL-GPC220. A molecular weight distribution was represented by a ratio of the weight average molecular weight and the number average molecular weight.
5) Environmental stress crack resistance (ESCR): The time until F50 (50% destruction) was measured using a 10% Igepal CO-630 Solution under a temperature condition of 50° C. according to ASTM D1693-B.
6) Crack Resistance: a cap (28 mm cap according to PET standard PCO 1881) was manufactured using the ethylene/alpha-olefin copolymer and an Angel injection molding machine of 120 ton screw 30ø standard under conditions of a processing temperature of 240° C., an injection speed of 78 mm/s, and a holding pressure of 650 bar. While the molded cap was immersed in a bath containing a 5% igepal solution, a water pressure of 5 bar was applied to the inside of the cap, and the time at which the water pressure begins to decrease was measured.

The results are shown in the following Table 1.

TABLE 1

| Unit | Density g/cm3 | $MFR_{2.16}$ g/10 min | MFRR($MFR_5$/ $MFR_{2.16}$) — | Weight average molecular weight g/mol | Molecular weight distribution — | ESCR Time | Crack Resistance Time |
|---|---|---|---|---|---|---|---|
| Ex. 1 | 0.952 | 0.22 | 6.7 | 200k | 10.6 | 350 | 110 |
| Ex. 2 | 0.952 | 0.45 | 7.2 | 170k | 12.3 | 220 | 100 |
| Ex. 3 | 0.953 | 0.52 | 6.9 | 168k | 12.2 | 190 | 105 |
| Ex. 4 | 0.953 | 0.56 | 6.9 | 165k | 12.6 | 185 | 105 |
| Ex. 5 | 0.951 | 0.33 | 6.6 | 180k | 9.8 | 255 | 115 |
| Comparative Ex. 1 | 0.952 | 0.78 | 3.4 | 140k | 9.8 | 180 | 95 |
| Comparative Ex. 2 | 0.952 | 1.74 | 3.4 | 105k | 8.8 | 130 | 40 |
| Comparative Ex. 3 | 0.953 | 0.84 | 3.9 | 155k | 13.4 | 50 | 35 |
| Comparative Ex. 4 | 0.952 | 2.00 | 3.5 | 85k | 4.3 | 20 | 12 |

The invention claimed is:
1. An ethylene/alpha-olefin copolymer, wherein
a weight average molecular weight is 50,000 g/mol to 250,000 g/mol,
a molecular weight distribution (Mw/Mn) is 4 to 20,
a density is 0.950 g/cm$^3$ to 0.965 g/cm$^3$,
a melt flow rate ratio ($MFR_5/MFR_{2.16}$) as measured at 190° C. according to ASTM 1238 is 3 to 10, and
environmental stress crack resistance as measured according to ASTM D1693-B is 150 hours to 350 hours.
2. The ethylene/alpha-olefin copolymer of claim 1, wherein the weight average molecular weight is 180,000 g/mol to 220,000 g/mol.
3. The ethylene/alpha-olefin copolymer of claim 1, wherein the molecular weight distribution (Mw/Mn) is 10 to 15.

4. The ethylene/alpha-olefin copolymer of claim 1, wherein the melt flow rate ratio is 5 to 8.

5. The ethylene/alpha-olefin copolymer of claim 1, wherein the environmental stress crack resistance is 200 hours to 400 hours.

6. The ethylene/alpha-olefin copolymer of claim 1, wherein
   crack resistance is 100 hours or more, the crack resistance is a time at which a water pressure begins to decrease, when the water pressure of 5 bar is applied to the inside of a cap obtained by injection-molding of the ethylene/alpha-olefin copolymer while the cap is immersed in a bath containing a 5% igepal solution, wherein the cap is a 28 mm cap according to PET standard PCO 1881.

7. The ethylene/alpha-olefin copolymer of claim 1, wherein
   the alpha-olefin is one or more selected from the group consisting of 1-propylene, 1-butene, 1-pentene, 1-hexene, 4-methyl-1-pentene, 1-octene, 1-decene, 1-docene, 1-tetradecene, 1-hexadecene, 1-octadecene, 1-eicosene, and mixtures thereof.

* * * * *